DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 275

T904,022

METHOD OF INCREASING THE SHARPNESS OF PHOTOGRAPHIC IMAGES

Richard K. Kurz, Kodak Park, Rochester, N.Y. 14650, and David V. Young, 2344 Nebraska Ave. NW., Washington, D.C. 20016

Filed Sept. 22, 1971, Ser. No. 182,881

Int. Cl. G03c *1/34*

U.S. Cl. 96—109

No Drawing. 12 Pages Specification

Photographic images of improved sharpness are obtained by incorporating physical development inhibitors, e.g. mercaptotetrazoles such as phenyl mercaptotetrazole, etc. thiazoles such as mercaptothiazoles, amino mercaptothiazoles, etc., triazoles such as mercaptotriazoles, etc., in a silver halide emulsion and developing the exposed emulsion in a developing composition containing a high concentration of silver solvents, e.g. thiocyanates such as sodium thiocyanate, thiosulfates such as sodium thiosulfate, etc. The improvement in image sharpness is a result of both Edge and Eberhard effects.